United States Patent Office 3,149,173
Patented Sept. 15, 1964

3,149,173
PRODUCTION OF LIQUID OLIGOMERS
OF 1,3-DIENES
Dietmar Wittenberg, Mannheim, and Herbert Mueller, Ludwigshafen (Rhine)-Gartenstadt, Germany, assignors to Badische Anilin- & Soda-Fabrik Aktiengesellschaft, Ludwigshafen (Rhine), Germany
No Drawing. Filed Dec. 21, 1960, Ser. No. 77,269
Claims priority, application Germany Dec. 22, 1959
8 Claims. (Cl. 260—666)

This invention relates to a process for the production of liquid oligomers of 1,3-dienes with the use of a new, improved catalyst.

By the term "oligomers" we understand open-chain or cyclic compounds which are composed of a small number of 1,3-diene molecules; they may, for example, consist of 2 to 10 molecules of a 1,3-diene. The oligomers of 1,3-dienes have boiling points of up to 150° C. at $10^{-7}$ mm. Hg absolute.

It is known that with the use of catalysts obtained from aluminum alkyls or aluminum alkyl halides and chromium or titanium halides, 1,3-dienes can be polymerized to cyclic hydrocarbons, such as cyclododecatriene-(1,5,9) (often simply referred to as cyclododecatriene) or cyclooctadiene-(1,5). In this process, also high molecular weight polymers are obtained, some of which are rubber-like and non-distillable. These polymers are not soluble in the usual solvents, but they swell therein so that the reaction mixture is converted into a highly viscous mass which is difficult to handle. This is especially troublesome when the process is carried out continuously. Moreover, the yields of desired oligomers are inevitably decreased. Another disadvantage of the said process resides in the fact that in some cases the reaction velocity, and consequently the space-time yield, are not particularly high.

It is an object of the present invention to provide a process for the production of oligomers of 1,3-dienes in which the simultaneous formation of undesirable high molecular weight rubber-like polymers is repressed and which can therefore be carried out continuously without difficulty. It is another object of the invention to provide a process which gives higher yields of desired oligomers of 1,3-dienes. It is a further object of the invention to provide a process in which oligomers of 1,3-dienes are formed at a greater reaction velocity. Other objects and advantages of the invention will become apparent from the following description.

In accordance with this invention, we have found that the said objects and advantages are achieved by using a catalyst which can be obtained from a titanium compound, an organyl-aluminum halide and at least one additive. Suitable additives include the metals of Groups Ia, IIa, IIb, IIIa and IIIb of the periodic system as well as substances which are capable of forming complexes with organyl-aluminum halides.

It is an advantage of the new process that the proportion of high molecular weight rubber-like polymers formed is kept low. Continuous operation is thereby considerably facilitated. The higher oligomers which are in general formed in minor amounts in addition to the cyclic trimers of the initial materials (some of the said higher oligomers are liquid and strongly unsaturated and are probably also cyclic compounds), are readily soluble in conventional solvents, such as ethers, hydrocarbons, chlorohydrocarbons or carbon disulfide. Their presence in the reaction mixture does not appreciably increase the viscosity of the reaction solution.

Another advantage of the new process resides in the fact that alkyl-aluminum dihalides may be used as catalyst components. Hitherto it has only been possible to use dialkyl-aluminum halides. Catalysts which are obtained from alkyl-aluminum dihalides and a titanium compound without the additives according to this invention, convert 1,3-dienes almost exclusively into rubber-like high molecular weight products. It is surprising that with the said additives trimers of the initial materials are in some cases obtained in yields which are better than those given by the known methods. The use of organyl-aluminum dihalides is desirable because smaller amounts of the valuable aluminum trialkyls are required for their production from aluminum trialkyls and aluminum chloride than are necessary for the preparation of dialkyl-aluminum halides. If, as in the known method, dialkyl-aluminum halides are used, the yields are increased by coemploying the additives according to this invention.

The higher oligomers (which are formed in addition to the cyclic trimers and some of which are liquid and strongly unsaturated and are probably also cyclic compounds) not only do not interfere when the process is carried out continuously, but are also valuable intermediate products for further reactions.

1,3-dienes suitable as initial materials include isoprene, 2,3-dimethylbutadiene-(1,3), cyclohexadiene-(1,3) and butadiene-(1,3). The preferred initial materials are butadiene-(1,3) (often simply referred to as butadiene) and butadiene-(1,3) substituted by one or two methyl groups. The dienes need not be pure, but may also be used in admixture with other substances which are inert under the conditions of the process. Thus a gas mixture obtained by the dehydrogenation of butane or butene may be directly used for the reaction.

Suitable titanium compounds include titanium(IV) acid esters, titanium halides, titanium ester halides and organo-titanium halides. Of the titanium(IV) acid esters, those are preferred which are derived from saturated aliphatic alcohols (paraffinic alcohols) or saturated cycloaliphatic alcohols (cycloparaffin alcohols) with 1 to 10 carbon atoms. Such esters include titanium tetramethylate, titanium tetraethylate, titanium tetrapropylate, titanium tetraoctylate, titanium tetracyclohexylate and titanium tetracyclooctylate.

The titanium halides are derived from trivalent or, advantageously, from tetravalent titanium. Suitable titanium halides include titanium(III) chloride, titanium (III) bromide, titanium(IV) bromide, titanium(IV) fluoride, titanium(IV) iodide and titanium(IV) chloride. Since it is readily accessible, the last-mentioned titanium halide is the preferred titanium compound for the production of the catalyst for the new process.

The titanium(IV) ester halides are derived from the said halides, especially from the chlorides, on the one hand, and from saturated aliphatic alcohols (paraffinic alcohols) or saturated cycloaliphatic alcohols (cycloparaffin alcohols) with 1 to 10 carbon atoms on the other hand. Suitable titanium ester halides include diethoxy titanium dichloride, triethoxy titanium monochloride and tricyclohexyloxytitanium monochloride.

Organo-titanium halides may also be used, i.e., compounds which in addition to the halogen contain one to three organic radicals, preferably alkyl radicals with 1 to 4 carbon atoms, attached to the titanium by way of a carbon atom. Methyl-titanium trichloride is an example of such compounds. Organo-titanium halides which have united with metal halides to form complexes are also suitable titanium compounds for the process according to the present invention, e.g., $C_6H_5 \cdot TiCl_2 \cdot AlCl_3$ and $C_6H_5 \cdot TiCl_2 \cdot 2AlCl_3$.

Suitable organyl-aluminum halides are compounds of the general formula $Al_2R_nX_{6-n}$, in which R represents an aliphatic or aromatic radical, X represents a halogen and $n$ represents a number from 1 to 5. Suitable compounds of the said kind include: $(C_2H_5)_2Al_2Cl_4$ (often simply referred to as ethyl-aluminum dichloride), $(C_2H_5)_4Al_2Cl_2$ (also referred to as diethyl-aluminum chloride), $(C_2H_5)_3Al_2Cl_3$ (ethyl-aluminum sesquichloride), $(C_4H_9)_2Al_2Cl_4$, $C_6H_5 \cdot Al_2Cl_5$ and $(C_6H_5)_3Al_2Cl_3$. Those compounds are preferred which contain alkyl radicals with 1 to 6 carbon atoms or phenyl radicals which may be substituted by one or two alkyl radicals with 1 to 4 carbon atoms, and which contain chlorine or bromine as the halogen.

The said additives decrease the tendency of the aluminum compound to form high molecular weight products and at the same time promote the formation of liquid oligomers. Suitable metals of Groups Ia, IIa, IIb, IIIa and IIIb of the periodic system include lithium, sodium, potassium, rubidium, cesium, beryllium, magnesium, calcium, strontium, barium, zinc, cadmium, aluminum, cerium, gallium, indium and thallium.

The compounds which form complexes with the alkyl-aluminum halides must be capable of filling the octet gap which the aluminum shows in the monomeric form of the organyl-aluminum halides. Suitable complex-forming compounds of the said kind include the salts of the alkali and alkaline earth metals, in particular their halides, hydrides, and their salts derived from fatty acids with 1 to 4 carbon atoms, as well as ethers, thioethers, amines and organic phosphines. The structure of the organic additives is not critical. The only requirements are that, besides the groups characteristic of the said classes of substances (—O—, N≡, P≡ or —S—), they should either have hydrocarbon structure or contain one or more additional atoms or groups which are attached to carbon atoms and which are inert under the conditions of the process. Such atoms and groups include halogen atoms attached to an aromatic ring, >C=O, carboxyl, cyano and carboalkoxy groups.

Primary, secondary and tertiary amines are suitable for use as additives. They may contain aliphatic, cycloaliphatic, araliphatic and/or aromatic radicals. The amine nitrogen may also form part of a heterocyclic ring which may contain one or two more hetero-atoms, e.g., oxygen, nitrogen, sulfur or phosphorus. Suitable amines include methylamine, dimethylamine, trimethylamine, butylamine, dicyclohexylamine, stearylamine, cyclooctylamine, cyclododecylamine, aniline, N-methylaniline, N,N-dimethylaniline, benzylaniline, β-phenylethylaniline, naphthylamine, pyridine, quinoline, piperazine, oxazoline, thiazole and carbazole.

The ethers, thioethers and organic phosphines which are suitable for use as additives may also contain aliphatic, cycloaliphatic, araliphatic and/or aromatic radicals. The characteristic atom (—O—, —S—, or P≡) may also form part of a heterocyclic ring. Suitable compounds of the said kind include diethyl ether, diphenyl ether, anisole, p-chloroanisole, glycolic acid methyl ester methyl ether, glycolic acid nitrile methyl ether, dibutyl ether, tetrahydrofurane, dioxane, diphenylene oxide, diethyl sulfide, diphenyl sulfide, dibenzyl sulfide, triphenylphosphine, triethylphosphine, thiomorpholine and 1,4-dithiacyclohexane.

It is of course also possible to add two or more of the said additives at the same time or to use compounds which contain two or more of the said characteristic groups and which thus are, for example, an amine and a thioether at the same time, such as phenothiazine.

For practical reasons, those amines, ethers, thioethers and organic phosphines are preferred which, apart from the groups characteristic of the said classes, have only hydrocarbon structure and contain up to 20 carbon atoms.

The advantageous mol ratio in which the said substances are used for the preparation of the catalyst is titanium compound: organyl-aluminum halide:complex-forming compound or metal=$1:\geq 2:\geq 1$, and is preferably within the limits 1:3–10:1.5–50. Optimum relative proportions for a given organyl-aluminum halide and a given complex-forming compound or a given metal are readily ascertained by experiment. It is also possible to use, instead of an organyl-aluminum halide and a complex-forming substance, complex compounds of aluminum alkyl halides of the kind defined below and one of the above-mentioned organic additives. In contradistinction to the aluminum alkyl halides, the said complex compounds are usually not pyrophoric and thus permit safer handling of the catalyst than is possible in the known methods. Suitable complex compounds include:

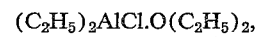

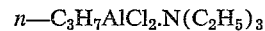
and

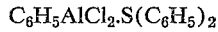

The new process is advantageously carried out in the presence of a solvent which is inert under the reaction conditions. Preferred solvents are aromatic halogen hydrocarbons and hydrocarbons. Aliphatic hydrocarbons and aliphatic halogen hydrocarbons are advantageously used in admixture with aromatic hydrocarbons or halogen hydrocarbons. Further suitable solvents include unsaturated cycloaliphatic hydrocarbons, provided they do not contain conjugated double bonds. Suitable solvents include benzene, toluene, xylene, chlorobenzene, chlorotoluene, bromobenzene, pentane, heptane, cyclohexane, cyclooctane, chlorocyclooctane, 2-chloro-n-octane, chloroform, trichloroethylene, cyclooctadiene-(1,5) and cyclododecatriene-(1,5,9).

The process may be carried out within a wide range of temperatures, viz., between about −50° and +150° C. The preferred reaction temperature is between +20° and +100° C.

As a rule, the reaction is carried out at atmospheric pressure. It is however possible to work under reduced or elevated pressure. If low-boiling initial materials and elevated reaction temperatures are used, elevated pressures, for example up to 10 atmospheres, are sometimes required.

The catalyst components, i.e., the titanium compound, the organyl-aluminum halide and the additive, are advantageously united in the solvent provided for the reaction and mixed thoroughly. It is advantageous to work in an inert gas atmosphere. Suitable inert gases include nitrogen, argon, carbon monoxide and carbon dioxide. The presence of oxygen and steam should, however, be avoided. It is often advantageous first to "develop" the catalyst. This may be done, for example, by intimately mixing the catalyst components for some time in a ball mill or vibratory mill. This is especially recommendable if a metal or a salt is used as the additive. The optimum period of mixing depends, inter alia, on the components used and is readily determined by experiment. The catalyst may also be developed by intimately mixing only one or two of the catalyst components with the solvent for some time and adding the further components, for example the additive, to the suspension thus obtained. Furthermore, the reaction may be carried out by commencing with a catalyst obtained from an organyl-aluminum halide and a titanium compound and then adding the additive.

If the catalyst components are mixed in the organic solvent, a suspension is usually obtained, into which the 1,3-diene is introduced. It is also possible to first filter this suspension and to convert the 1,3-diene in the catalyst solution thus obtained. This applies in particular to catalysts which have been prepared with the use of an aryl-aluminum halide. If the reaction is carried out in a solution, the yields are as a rule at least equal to those obtained by using a suspension. Moreover, continuous operation is facilitated.

The 1,3-diene is introduced into the catalyst mixture obtained (if desired, after separation of undissolved constituents). Reaction sets in with considerable evolution of heat. The desired reaction temperature is maintained by supplying appropriate amounts of initial material and, if required, by cooling. To complete the reaction, the reaction temperature is preferably maintained constant for some time after the supply of initial material has ended. The catalyst is then destroyed, for example by cautiously adding a small amount of water or of an alcohol or by adding a large amount of acetone to the reaction mixture. Small amounts of high molecular weight products are thereby separated. After decomposition of the catalyst, the mixture is worked up in the usual manner, for example by shaking out with water and distilling the organic phase after separation from the aqueous phase or, if decomposition has been carried out by means of alcohol or water, by distillation after separation of the solid constituents.

The process can also be carried out continuously without difficulty, for example in a spiral tube into which the catalyst (suspended or dissolved in a solvent) is continuously supplied at one end and into which the diene is continuously forced at the same time and at the same end. The reaction mixture leaving at the other end of the spiral tube is treated continuously with methanol to decompose the catalyst. The product is then introduced into a continuously operating distillation column.

The lower liquid oligomers obtainable by the process are valuable intermediate products for organic synthesis. They may, for example, be hydrogenated in known manner, e.g., cyclododecatriene-(1,5,9) may be converted to cyclododecane or cyclododecene. The hydrogenated products may in turn be converted in known manner to dicarboxylic acids, such as dodecane-1,12-diacid, or to lactams, such as lauryl lactam. The latter are known to be valuable initial materials for plastics, in particular for polyamides and polyesters. The higher liquid, strongly unsaturated hydrocarbons are suitable, for example, for use as initial materials for the production of textile or mineral auxiliaries or as bases for lacquers varnishes and plastics.

The invention is further illustrated, but not limited, by the following examples. The parts are by weight.

Example 1

1.14 parts of titanium tetrachloride, 2 parts of aluminum grit and 3.7 parts of ethyl-aluminum dichloride are ground in 90 parts of benzene in a ball mill for 10 hours. The resultant catalyst suspension is transferred, in an argon atmosphere, to an agitator vessel provided with a thermometer, a reflux condenser and a gas inlet pipe. Butadiene-(1,3) is introduced in a rapid stream. The temperature rapidly rises to 50° C. The temperature is maintained at 50° to 55° C. by cooling. After 35 minutes, 142 parts of butadiene have been taken up by the catalyst suspension. The mixture is agitated for another 30 minutes, then 10 parts of methanol are added to decompose the catalyst, and the mixture is distilled. 110 parts (78% of the theory) of cyclododecatriene-(1,5,9) (boiling point 85° C./7 mm. Hg; $n$ 20/D 1.5074) and 18 parts of a fraction of higher, strongly unsaturated hydrocarbons (boiling point 100–160° C./10⁻⁵ mm. Hg; average molecular weight 340; hydrogenation iodine number 410) are obtained. 12 parts of a viscous brown oil remain as a distillation residue.

Example 2

A catalyst suspension is prepared from 0.57 part of titanium tetrachloride, 3 parts of ethyl-aluminum dichloride and 2 parts of very finely pulverized zinc in 90 parts of benzene. 243 parts of butadiene are passed into the mixture at 50° to 55° C. in the course of 90 minutes. The mixture is worked up as described in Example 1, and 191 parts (79% of the theory) of cyclododecatriene-(1,5,9) and 52 parts (21% of the theory) of strongly unsaturated hydrocarbons are obtained.

By using additives other than zinc, the following results are obtained:

| Additive | Amount (parts) | Solvent | Cyclododecatriene (percent) of theory) |
|---|---|---|---|
| Magnesium | 1 | Benzene | 70 |
| Lithium | 0.2 | do | 75 |
| Sodium chloride | 0.5 | Chlorobenzene | 86 |

Example 3

Butadiene is introduced at 50° to 60° C. into a catalyst suspension prepared from 0.57 part of titanium tetrachloride, 3 parts of ethyl-aluminum dichloride and an organic complex-forming compound in 100 parts of chlorobenzene. The mixture is worked up as described in Example 1 and, in addition to higher, strongly unsaturated hydrocarbons (some of which are liquid), cyclododecatriene-(1,5,9) is obtained in the following yields (with reference to the amount of initial material converted):

| Parts | Complex-forming compound | Cyclododecatriene-(1,5,9) (percent) of theory |
|---|---|---|
| 0.3 | Diethyl ether | 67 |
| 1.3 | Anisole | 76 |
| 2.0 | Diphenyl ether | 58 |
| 1.0 | Diethyl sulfide | 90 |
| 2.5 | Dibenzyl sulfide | 83 |
| 2.5 | Diphenyl sulfide | 77 |
| 2.0 | Diphenylamine | 86 |
| 1.3 | Triphenylphosphine | 63 |
| 1.0 | Phenothiazine | 66 |

If the above procedure is followed, but the said complex-forming compounds are not added, rubber-like high molecular weight products are almost exclusively obtained.

Example 4

The procedure of Example 3 is followed but, in addition to 0.57 part of titanium tetrachloride, the catalyst components and solvents specified in the following table are used:

| Parts of organyl-aluminum halide | Parts of additive | Solvent | Cyclododecatriene-(1,5,9) (percent of theory) |
|---|---|---|---|
| 3.0 ethyl-aluminum dichloride. | 2.5 diphenyl sulfide. | Cyclododecatriene-(1,5,9). | 65 |
| Do | do | 20% benzene, 80% heptane. | 74 |
| 2.2 ethyl-aluminum sesquichloride. | 1.0 diphenyl sulfide. | Chlorobenzene | 92 |
| Do | 2.5 diphenyl sulfide. | do | 92 |
| 1.4 diethyl-aluminum chloride. | do | do | 87 |

Example 5

A catalyst suspension is prepared, as described in Example 1, from 1.14 parts of titanium tetrachloride, 2.8 parts of diethyl-aluminum chloride and 0.66 part of lithium chloride in 90 parts of benzene. Reaction with butadiene-(1,3) gives, after working up as described in Example 1, cyclododecatriene-(1,5,9) in a yield of 86%. If 0.6 part of sodium chloride is used as a complex-forming compounds, the yield is 88%; if 0.42 part of sodium fluoride is used, the yield is 84%. Small amounts of strongly unsaturated higher hydrocarbons (some of which are liquid) are obtained as byproducts. They are readily dissolved in the usual solvents.

*Example 6*

A catalyst suspension is prepared from 0.57 part of titanium tetrachloride, 3 parts of ethyl-aluminum dichloride and 4.3 parts of cerium metal chips in 90 parts of benzene by grinding in a ball mill for three hours. 164 parts of butadiene-(1,3) are introduced into the mixture in the course of 120 minutes. The mixture is worked up as described in Example 1, and 131 parts (80% of the theory) of cyclododecatriene-(1,5,9) and 33 parts (20% of the theory) of higher, strongly unsaturated hydrocarbons are obtained.

*Example 7*

A cataylst suspension is prepared from 2.28 parts of titanium tetrachloride, 12 parts of ethyl-aluminum dichloride and 0.4 part of lithium in 140 parts of benzene by grinding in a ball mill for three hours. 100 parts of isoprene are introduced into the mixture at 45° to 50° C. in the course of three hours. The mixture is then agitated at this temperature for another 16 hours. After decomposition of the catalyst with 15 parts of methanol and subsequent filtration, the mixture is distilled. There are obtained 56.5 parts (65% of the theory with reference to the amount of isoprene converted) of lower liquid polymers with a boiling range of 100° to 200° C./5 mm. Hg and 22 parts (25%) with a boiling range of 150° to 250° C./0.5 mm. Hg. The distillation residue (9 parts, 10% of the theory) is soluble in the usual solvents.

*Example 8*

Butadiene-(1,3) is introduced for 75 minutes at 50° to 60° C. into a catalyst solution prepared from 0.66 part of triethoxy titanium chloride, 4.2 parts of ethyl-aluminum dichloride and 1.0 part of diphenyl sulfide in 100 parts of chlorobenzene. After addition of 10 parts of methanol, the mixture is distilled and gives 144 parts (85% of the theory) of cyclododecatriene-(1,5,9) and 25 parts (15% of the theory) of higher, strongly unsaturated hydrocarbons (some of which are liquid).

*Example 9*

Butadiene-(1,3) is introduced for 60 minutes at 60° to 70° C. into a catalyst suspension prepared from 0.43 part of titanium tetrachloride, 2.8 parts of phenyl-aluminum dichloride and 0.7 part of diphenyl sulfide in 100 parts of chlorobenzene. After addition of 10 parts of methanol, the mixture is distilled and gives 226 parts (82% of the theory) of cyclododecatriene-(1,5,9) and 49 parts (18% of the theory) of higher, strongly unsaturated hydrocarbons (some of which are liquid).

If 1.2 parts of titanium tetraiodide are used instead of titanium tetrachloride, the yield of cyclododecatriene-(1,5,9) is 87% of the theory. If the catalyst suspension prepared with the use of titanium tetrachloride is heated, prior to the introduction of butadiene, for 2 hours at 80° C. and insoluble constituents are separated by filtration, a yield of 85% of the theory of cyclododecatriene is obtained on introduction of butadiene into the catalyst suspension.

*Example 10*

A catalyst suspension is prepared from 1.0 parts of titanium trichloride, 0.2 part of aluminum and 3.9 parts of phenyl-aluminum sesquichloride by grinding for three hours in 80 parts of benzene. Butadiene is introduced into the mixture for 60 minutes at 55° to 60° C. The yield of cyclododecatriene-(1,5,9) is 245 parts (84% of the theory). If 1.5 parts of the complex $C_6H_5TiAl_2Cl_8$ are used instead of titanium trichloride, cyclododecatriene is obtained in a yield of 86%.

*Example 11*

Butadiene-(1,3) is introduced for 150 minutes at 55° to 65° C. into a catalyst solution prepared from 0.7 part of titanium tetraethylate, 4.0 parts of ethyl-aluminum dichloride and 0.6 part of diphenyl sulfide in 90 parts of benzene. After addition of 10 parts of methanol, the mixture is distilled and gives 194 parts (84% of the theory) of cyclododecatriene-(1,5,9). Similar results are obtained by using, instead of titanium tetraethylate, 2 parts of titanium tetracyclohexylate.

*Example 12*

252 parts of butadiene-(1,3) are introduced in the course of 120 minutes at 55° to 65° C. into a catalyst suspension prepared from 0.57 part of titanium tetrachloride, 2 parts of ethyl-aluminum sesquichloride and 0.25 part of calcium fluoride in 90 parts of benzene by grinding for 3 hours. After addition of 10 parts of methanol, the mixture is distilled and gives 234 parts (93% of the theory) of cyclododecatriene-(1,5,9).

If 0.24 part of pyridine is used instead of calcium-fluoride, the yield is 88% of the theory.

If 0.3 part of triethylamine is used instead of calcium fluoride, the yield is 84%.

84% of cyclododecatriene are also obtained by using 0.8 part of heptadecane diamine or 0.3 part of n-butylamine as complex-forming compound.

Similar results are obtained by using magnesium bromide or potassium iodide.

*Example 13*

249 parts of butadiene are introduced in the course of 120 minutes at 65° to 70° C. into a catalyst suspension prepared from 0.37 part of titanium tetrafluoride, 0.6 part of diphenyl sulfide and 8 parts of phenyl-aluminum sesquichloride in 90 parts of benzene by grinding for 4 hours. After addition of 10 parts of methanol, the mixture is distilled and gives 210 parts (86% of the theory) of cyclododecatriene.

*Example 14*

The procedure described in Example 9 is followed, but 2 parts of dipropyl-aluminum chloride are used as organoaluminum component. The yield of cyclododecatriene-(1,5,9) is 82% of the theory.

We claim:

1. In a process for the production of oligomers of 1,3-dienes in the presence of a catalyst, the improvement which comprises conducting said process with a catalyst system formed from:
   (a) a titanium compound selected from the group consisting of titanium (IV) acid esters, titanium halides, titanium (IV) ester halides and organo-titanium halides;
   (b) an organyl-aluminum halide of the general formula $Al_2R_nX_{6-n}$ in which R represents a substituent selected from the group consisting of aliphatic and aromatic hydrocarbon radicals containing only carbon and hydrogen atoms, X represents halogen and n is an integer of from 1 to 5, inclusive; and
   (c) at least one member selected from the group consisting of metals of Groups Ia, IIa, IIb, IIIa and IIIb of the periodic system, salts of alkali and alkaline earth metals, amines, ethers, thioethers and organic phosphines.

2. A process as claimed in claim 1 wherein components (b) and (c) are combined as a complex compound.

3. A process as claimed in claim 1 wherein component (a) is titanium (IV) chloride.

4. A process as claimed in claim 1 wherein component (b) is an alkyl aluminum chloride containing 1 to 6 carbon atoms in each alkyl substituent.

5. A process as claimed in claim 1 wherein component (b) is an alkyl aluminum bromide containing 1 to 6 carbon atoms in each alkyl substituent.

6. A process as claimed in claim 1 wherein component (b) is a phenyl aluminum chloride.

7. A process as claimed in claim 1 wherein component (b) is a phenyl aluminum bromide.

8. A process as claimed in claim 1 wherein component (b) is ethyl-aluminum dichloride.

References Cited in the file of this patent

UNITED STATES PATENTS

| | | |
|---|---|---|
| 2,504,016 | Foster | Apr. 11, 1950 |
| 2,686,208 | Reed | Aug. 10, 1954 |
| 2,964,574 | Wilke | Dec. 13, 1960 |